US009342795B1

(12) United States Patent
Poole et al.

(10) Patent No.: US 9,342,795 B1
(45) Date of Patent: May 17, 2016

(54) ASSISTED LEARNING FOR DOCUMENT CLASSIFICATION

(71) Applicant: EMC Corporation, Hopkinton, MA (US)

(72) Inventors: James Poole, Atlanta, GA (US); Alok Ojha, Chelmsford, MA (US)

(73) Assignee: EMC Corporation, Hopkinton, MA (US)

( * ) Notice: Subject to any disclaimer, the term of this patent is extended or adjusted under 35 U.S.C. 154(b) by 318 days.

(21) Appl. No.: 13/910,380

(22) Filed: Jun. 5, 2013

(51) Int. Cl.
  *G06F 15/18* (2006.01)
  *G06N 99/00* (2010.01)
  *G06N 5/00* (2006.01)
  *G06N 3/00* (2006.01)

(52) U.S. Cl.
  CPC .............. *G06N 99/005* (2013.01); *G06N 3/004* (2013.01); *G06N 5/00* (2013.01)

(58) Field of Classification Search
  None
  See application file for complete search history.

(56) References Cited

U.S. PATENT DOCUMENTS

| | | | |
|---|---|---|---|
| 7,047,236 B2* | 5/2006 | Conroy et al. | |
| 8,745,091 B2* | 6/2014 | McHenry et al. | 707/791 |
| 2002/0169764 A1* | 11/2002 | Kincaid | G06F 17/30713 |
| 2004/0215455 A1* | 10/2004 | Kemp | G10L 15/22 |
| | | | 704/235 |
| 2006/0095521 A1* | 5/2006 | Patinkin | 709/206 |
| 2008/0086432 A1* | 4/2008 | Schmidtler | G06N 99/005 |
| | | | 706/12 |
| 2010/0312725 A1* | 12/2010 | Privault | G06N 5/043 |
| | | | 706/12 |
| 2011/0106797 A1* | 5/2011 | Palakodety et al. | 707/728 |
| 2013/0018824 A1* | 1/2013 | Ghani | G06N 99/005 |
| | | | 706/12 |

OTHER PUBLICATIONS

Wikipedia, Cluster Analysis, http://en.wikipedia.org/wiki/Data_clustering, Jun. 3, 2013, pp. 1-16.
Wikipedia, Cross-Validation (Statistics), http://en.wikipedia.org/wiki/Cross-validation_(statistics), Jun. 3, 2013, pp. 1-6.
Wikipedia, Precision and Recall, http://en.wikipedia.org/wiki/Precision_and_recall, Jun. 3, 2013, pp. 1-7.
Wikipedia, F1 Score, http://en.wikipedia.org/wiki/F1_score, Jun. 3, 2013, pp. 1-2.

* cited by examiner

*Primary Examiner* — Luis Sitiriche
(74) *Attorney, Agent, or Firm* — Ryan, Mason & Lewis, LLP (57) ABSTRACT

Methods, apparatus and articles of manufacture for assisted learning for document classification are provided herein. A method includes analyzing a collection of documents within a document repository to identify a set of multiple documents corresponding to a sample document, presenting at least a portion of the set of multiple documents to a user for user classification, and calculating a confidence measure based on the user classification of the at least a portion of the set of multiple documents, wherein said confidence measure corresponds to a level of accuracy by which a document classification algorithm detects one or more documents related to the sample document.

20 Claims, 4 Drawing Sheets

ASSISTED LEARNING FOR DOCUMENT CLASSIFICATION

FIELD

The field relates generally to information technology, and more particularly to document classification techniques.

BACKGROUND

Traditional data loss prevention (DLP) and document classification techniques that search for rigid keywords and regular expressions present short-comings for many use cases. For example, in many instances, customers aim to protect assets such as contracts, design documents, merger- and/or acquisition-related documents, marketing campaigns, patent applications, etc. Because these types of documents are often less structured than other documents associated with DLP techniques, machine learning is commonly utilized for detection purposes. By way of example, such approaches include implementing an algorithm that attempts to learn features of each type of document for an individual customer.

However, existing machine learning approaches for document classification face challenges with respect to adoption and accuracy rates. For example, while such algorithms can provide accuracy when implemented with a complete and accurate learning set, real-world deployments commonly include scenarios wherein the customers and/or users do not have a complete learning set and/or sufficient resources to gather and provide a sufficient number of positive and negative documents to adequately train an algorithm. As used herein, "positive" documents are sample documents that belong to the category that the user is trying to identify, and "negative" documents do not belong to that category. Additionally, users may not, for example, be in a position to identify and provide appropriate and/or optimal types of documents to represent a learning set.

SUMMARY

One or more illustrative embodiments of the present invention provide techniques for assisted learning for document classification.

In accordance with an aspect of the invention, a method is provided comprising the steps of: analyzing a collection of documents within a document repository to identify a set of multiple documents corresponding to a sample document, presenting at least a portion of the set of multiple documents to a user for user classification, and calculating a confidence measure based on the user classification of the at least a portion of the set of multiple documents, wherein said confidence measure corresponds to a level of accuracy by which a document classification algorithm detects one or more documents related to the sample document.

In accordance with another aspect of the invention, a method is provided comprising the steps of: receiving a sample document from a user, wherein said sample document represents a type of document to be classified by a document classification algorithm; and analyzing a collection of documents within a document repository identified by the user to identify a set of multiple documents corresponding to a sample document. Such a method additionally comprises the steps of: presenting at least a portion of the set of multiple documents to a user for manual classification of each of the presented documents as either (i) related to the sample document or (ii) not related to the sample document; and calculating a confidence measure based on the manual classification of the at least a portion of the set of multiple documents, wherein said confidence measure corresponds to a level of accuracy by which a document classification algorithm detects one or more documents related to the sample document.

The document classification techniques of the illustrative embodiments overcome one or more of the problems associated with the conventional techniques described previously, and provide more accurate classification capabilities. These and other features and advantages of the present invention will become more readily apparent from the accompanying drawings and the following detailed description.

DETAILED DESCRIPTION

As will be described, the present invention, in one or more illustrative embodiments, provides techniques for assisted learning for document classification.

Illustrative embodiments of the present invention will be described herein with reference to exemplary communication systems and associated processing devices (such as a computer, server, mobile telephone, tablet, etc.). It is to be appreciated, however, that the invention is not restricted to use with the particular illustrative system and device configurations shown.

As noted above, for an algorithm to sufficiently function in a document classification capacity, the algorithm preferably learns from positive samples of the document type in question, as well as from a diverse sample of negative documents that are similar to documents the classification algorithm is likely to encounter. A useful negative document in a training set can include, for example, a document that is similar in content to documents that the algorithm will likely encounter during classification (yet divergent in one or more other capacities). Accordingly, in contrast to disadvantageous existing approaches detailed above, at least one embodiment of the invention includes interactively guiding a user through discovering a detailed and accurate set of training data, as well as providing confidence parameters to the user associated with the readiness of the machine learning classification engine for deployment in the production environment of the user.

Figure 1:
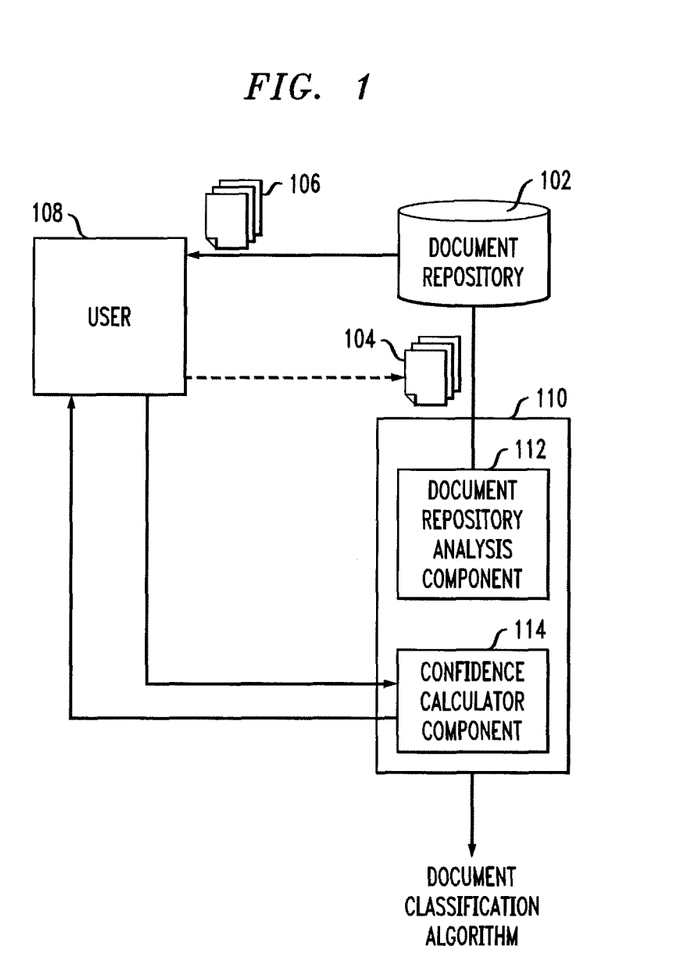
FIG. 1 is a block diagram illustrating an example system implementation according to an embodiment of the invention.

FIG. 1 is a block diagram illustrating an example system implementation according to an embodiment of the invention. By way of illustration, FIG. 1 depicts a document classification system 110, a document repository 102 and a user 108. As detailed herein, the document classification system 110 can be implemented within a communication device or analogous device or apparatus (such as a computer, server, mobile telephone, tablet, etc.). As depicted in FIG. 1, the document classification system 110 includes a document repository analysis component 112 as well as a confidence calculator component 114.

As described additionally herein, the document classification system 110 (via document repository analysis component 112) analyzes a collection of documents within a document repository such as repository 102 to identify a set of documents 106 corresponding to a sample document 104. In at least one embodiment of the invention, the sample document 104 is provided by the user 108. The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device.

In at least one embodiment of the invention, the document repository analysis component 112 can include parsing the collection of documents within the document repository based on document type, keyword(s), and/or items of metadata, as well as selecting the ultimate set of documents 106 based on document attributes, and/or selecting the set of documents 106 that provide the highest marginal learning benefit.

Accordingly, as noted above, the document classification system 110 identifies a set of documents 106 from the document repository 102 corresponding to a sample document 104, and presents the set of documents 106 to the user for user classification. Additionally, the document classification system 110 (via confidence calculator component 114) calculates a confidence measure based on the user classification of the set of documents 106. The confidence measure corresponds to a level of accuracy by which a document classification algorithm (resident on and/or generated by the document classification system 110) detects documents related to the sample document 104.

As also depicted in FIG. 1, the document classification system 110 can deploy a document classification algorithm if the calculated confidence measure surpasses a threshold value, or if the user determines the confidence measure to be acceptable. In the alternative, the document classification system 110 can present additional documents to the user for user classification if the calculated confidence measure is unsatisfactory, and these steps can be iterated until such a satisfactory measure is reached.

Figure 2:
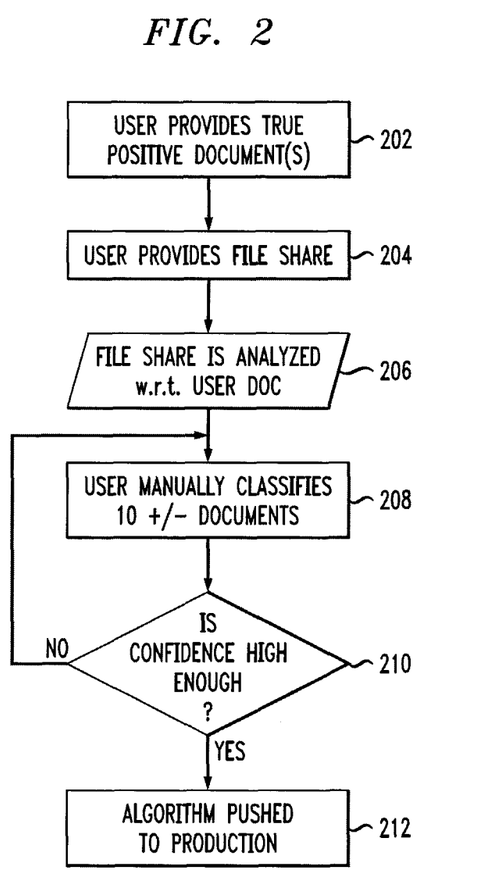
FIG. 2 is a flow diagram illustrating techniques according to an embodiment of the invention.

FIG. 2 is a flow diagram illustrating techniques according to an embodiment of the invention. As noted herein, an aspect of the invention includes interactively guiding a user through a learning phase of a document classification algorithm. As depicted in FIG. 2, in step 202, the user is queried to provide one or more sample positives documents that match the type of documents that the user wishes to monitor via the document classification algorithm. For example, if the user wishes to monitor merger and acquisition documents in a DLP product on the user network, the user would provide one or more documents from past transactions that correspond to merger and acquisition subject matter.

Additionally, in step 204, the user is queried to identify and/or provide a file share and/or repository that is likely to contain documents similar to types provided in step 202 (that is, documents similar to the provided positive sample documents). Further to the example above, the user could provide access to a network share where the legal department stores documents (including documents pertaining to past and/or current mergers and acquisitions transactions). Step 206 includes accessing the identified file share and/or repository and analyzing available files therein. During such analysis, at least one embodiment of the invention includes parsing and interpreting different file types contained within the file share and/or repository by examining keywords and/or metadata.

Keywords are selected based on the documents that are analyzed. For example, in some instances, each word found in an entire document set (in a high memory usage case, for example) is tracked, while in other instances, only a set of the most commonly detected words (that is, words detected in the most documents) is tracked. By way of example, an algorithm might keep track of the 3,000 most commonly occurring words in the document set. Also, the algorithm can disregard certain commonly occurring words in the English language, such as "the," "and," "a," etc. In at least one embodiment of the invention, such features are implemented as configuration options in the algorithm to determine how many keywords to track and/or a list of words to ignore.

With respect to metadata, as noted above, documents may also contain hints or information pertaining to identification of the type of document based on features not related to keywords. For example, if the owner or author of a document is identified within the document, such information may assist in determining the type of document (for example, if the owner or author of the document is an attorney, the document is likely to be a legal document). Examples of such metadata can include metadata pertaining to where the document is located, metadata pertaining to any user accounts associated with the document, metadata pertaining to document type, or metadata pertaining to other attributes associated with the document not based on keywords within the document.

Step 208 includes presenting the user with a list of files (or documents) for the user to manually provide and/or identify a classification. Determining which files to present to the user for manual classification can be based on multiple attributes. Also, a pre-defined number of documents can be selected and presented to the user, wherein such a pre-defined number can be configurable. For instance, at least one embodiment of the invention includes presenting documents based on the marginal learning benefit associated with the documents (for example, presenting documents that would provide the algorithm the highest marginal learning benefit). In determining which documents would provide the highest marginal learning benefit, at least one embodiment of the invention includes grouping the documents into multiple clusters of similar type documents, and presenting to the user a document from closest to the center of each cluster (starting, for example, with the cluster containing the most documents, and continuing with each additional cluster in descending order) to ensure that the learning algorithm interacts with a sampling of each type of document.

Additionally, when determining an overall confidence score to present to the user (as implemented in at least one embodiment of the invention), each document previously categorized by the user is tested by an algorithm to determine the accuracy of the user categorization. If the algorithm mis-categorizes a document, another document can be selected from the same cluster as the mis-categorized document to be manually classified by the user. By doing this, the algorithm acquires another data point to learn from this type of document, thereby increasing performance capability.

Also, in accordance with at least one embodiment of the invention, documents presented to a user for manual classification that fall near the border of two different clusters are considered to belong to the two different cluster categories.

By having the user manually classify such documents, ambiguous documents can be more definitively identified as per type of document.

An example embodiment of the invention can include presenting approximately ten documents to the user. The user, as noted, would then be queried to manually classify the documents as positive or negative documents. Additionally, in at least one embodiment of the invention, an "ignore" option can be provided to the user as well (for example, for use in a case wherein a user is uncertain as to a document's classification). If a document is marked as "ignore," the learning algorithm can simply not use the document in any subsequent learning or training steps.

In the above-noted merger and acquisition document type example, the user can be queried to mark each presented document as a positive document if the document is related to a merger and/or acquisition activity or context; otherwise, the user would mark the document as a negative document.

Once all documents presented to the user in step 208 have been manually classified, at least one embodiment of the invention includes calculating and providing the user with a confidence level pertaining to the accuracy of the manually classified documents. The confidence level can, for example, take the form of a heuristic that implies how confident the algorithm is that it (that is, the algorithm) could accurately detect this specific type of document in the field based on the manually classified set of documents. Additionally, as of this step, the user has preferably manually provided feedback for a certain number of documents regarding each document's classification as a positive document or a negative document. Such feedback information can be used to test whether an algorithm can correctly identify the corresponding documents using a variety of techniques (such as, for example, K-Folds Cross-Validation) understood and appreciated by one skilled in the art. Using such techniques, precision and recall scores can be determined, and an F-measure (accuracy) can be calculated and presented to the user.

Based on the provided confidence level, the user makes a determination in step 210 as to the sufficiency of said confidence level. If the user is satisfied with the indicated confidence level, the user can deploy the machine learning classifier via step 212, wherein additional policies can also be enforced. Policies may include, generally, instructions for and/or parameters regarding actions to be taken (or not taken) once it is known that a certain document belongs to a certain classification. For example, at least one embodiment of the invention includes the use of DLP policies. Such policies can be, for instance, generated by an administrator of the product to enforce certain rules.

Otherwise, if the user is not satisfied with the indicated confidence level, the user can choose to return to step 208 whereby the user is presented with additional documents to manually classify. Accordingly, the algorithm would acquire additional user input to potentially generate a higher confidence level. In at least one embodiment of the invention, the user can iterate between steps 210 and 208 until the user determines that the confidence level reaches an acceptable level for deployment.

Figure 3:
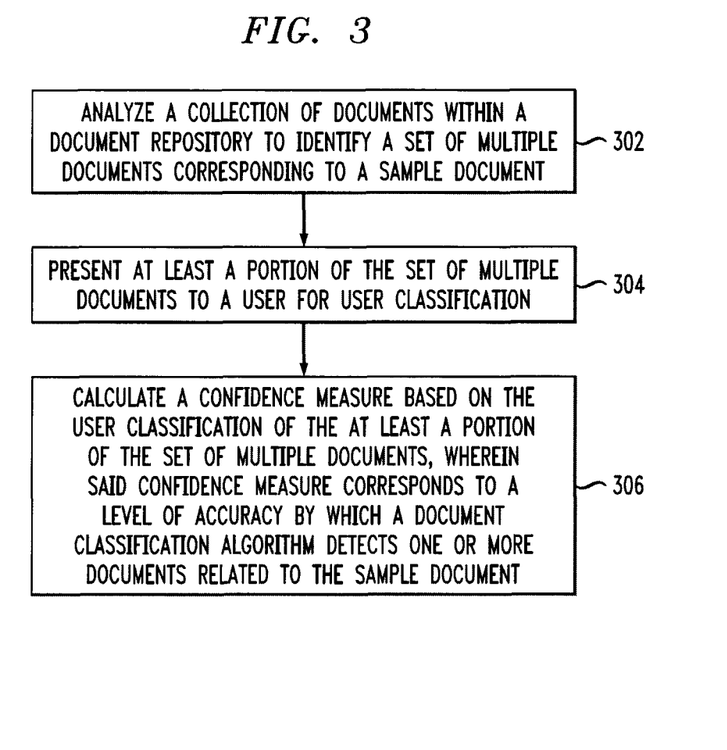
FIG. 3 is a flow diagram illustrating techniques according to an embodiment of the invention.

FIG. 3 is a flow diagram illustrating techniques according to an embodiment of the present invention. Step 302 includes analyzing a collection of documents within a document repository to identify a set of multiple documents corresponding to a sample document. The analyzing step can include parsing the collection of documents within the document repository based on document type, based on one or more keywords, and/or based on one or more items of metadata.

Step 304 includes presenting at least a portion of the set of multiple documents to a user for user classification. Presenting documents to a user for user classification can include selecting one or more documents from the set of multiple documents based on one or more document attributes. Additionally, in at least one embodiment of the invention, presenting documents to a user for classification includes selecting one or more documents from the set of multiple documents based on a marginal learning benefit associated with the one or more documents (for example, selecting the documents that provide the highest marginal learning benefit).

Step 306 includes calculating a confidence measure based on the user classification of the at least a portion of the set of multiple documents, wherein said confidence measure corresponds to a level of accuracy by which a document classification algorithm detects one or more documents related to the sample document.

The techniques depicted in FIG. 3 can also include deploying the document classification algorithm if the calculated confidence measure surpasses a threshold value, wherein the threshold value can be determined by the user. Additionally, at least one embodiment of the invention includes presenting one or more additional documents from the set of multiple documents to the user for user classification if the calculated confidence measure does not meet the threshold value. Also, as detailed herein, this sequence of steps can be repeated until the calculated confidence measure surpasses a threshold value (which can be determined by the user).

Further, the techniques depicted in FIG. 3 can include querying the user to provide the sample document, wherein the sample document represents a type of document to be classified by the document classification algorithm. Also, at least one embodiment of the invention includes querying the user to identify the document repository, wherein the document repository is associated with the user and contains documents similar to the sample document. Additionally, the techniques depicted in FIG. 3 can also include querying the user to manually classify the presented documents as related to the sample document (that is, a positive document) or not related to the sample document (that is, a negative document).

Additionally, at least one embodiment of the invention includes receiving a sample document from a user, wherein said sample document represents a type of document to be classified by a document classification algorithm, and analyzing a collection of documents within a document repository identified by the user to identify a set of multiple documents corresponding to a sample document. Such an embodiment of the invention also includes presenting at least a portion of the set of multiple documents to a user for manual classification of each of the presented documents as either (i) related to the sample document or (ii) not related to the sample document. Further, such an embodiment of the invention includes calculating a confidence measure based on the manual classification of the at least a portion of the set of multiple documents, wherein said confidence measure corresponds to a level of accuracy by which a document classification algorithm detects one or more documents related to the sample document.

Techniques of the type described herein may be implemented in a wide variety of different applications. An additional exemplary communication system application that may incorporate such techniques will now be described with reference to FIG. 4.

Figure 4:
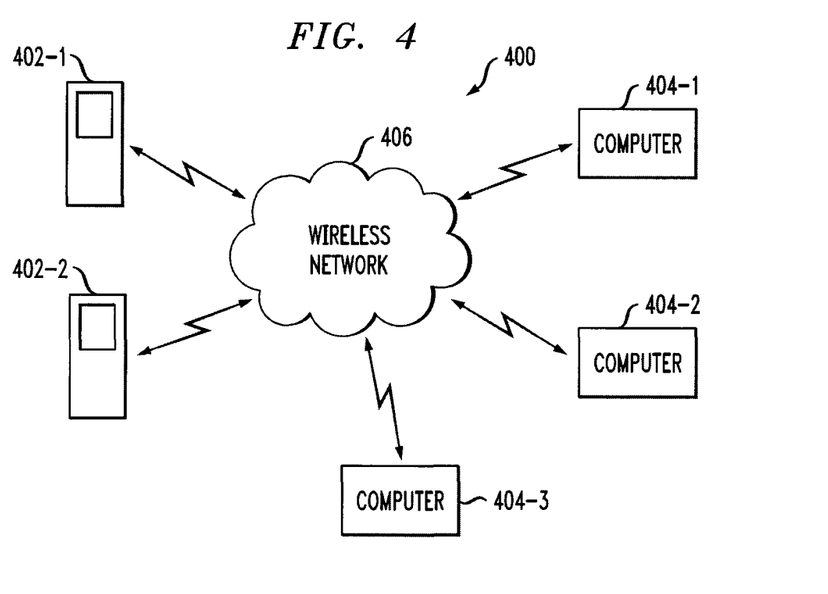
FIG. 4 shows an exemplary embodiment of a communication system that may incorporate the functionality of the type illustrated in at least one embodiment of the invention.

Referring to FIG. 4, a communication system 400 comprises a plurality of mobile telephones 402-1 and 402-2 and computers 404-1, 404-2 and 404-3, configured to communicate with one another over a network 406.

Any two or more of the devices 402 and 404 may correspond to devices configured to implement at least one embodiment of the invention (such as, for example, document classification system 110), as previously described. It is to be appreciated that the techniques disclosed herein can be implemented in numerous other applications.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart(s) and block diagram(s) in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 5:
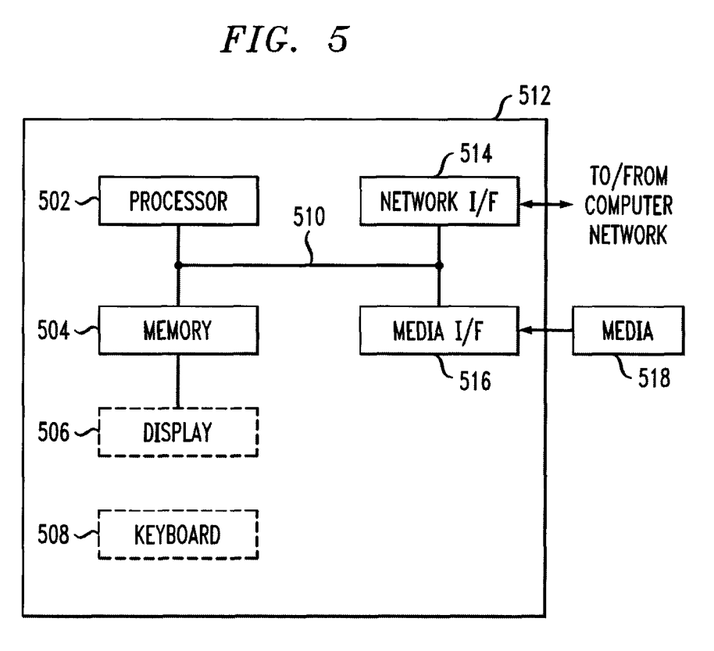
FIG. 5 is a system diagram of an exemplary computer system on which at least one embodiment of the invention can be implemented.

By way of example, an aspect of the present invention can make use of software running on a general purpose computer. As noted above, FIG. 5 is a system diagram of an exemplary computer system on which at least one embodiment of the invention can be implemented. As depicted in FIG. 5, an example implementation employs, for example, a processor 502, a memory 504, and an input/output interface formed, for example, by a display 506 and a keyboard 508. The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 502, memory 504, and input/output interface such as display 506 and keyboard 508 can be interconnected, for example, via bus 510 as part of a data processing unit 512 (such as, for example, document classification system 110). Suitable interconnections via bus 510, can also be provided to a network interface 514 (such as a network card), which can be provided to interface with a computer network, and to a media interface 516 (such as a diskette or compact disc read-only memory (CD-ROM) drive), which can be provided to interface with media 518.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 508, displays 506, and pointing devices, can be coupled to the system either directly (such as via bus 510) or through intervening I/O controllers.

Network adapters such as network interface 514 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 512 as depicted in FIG. 5) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electro-magnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language and conventional procedural programming languages. The program code may execute entirely on a user's computer, partly on a user's computer, as a stand-alone software package, partly on a users computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems and devices that can benefit from document classification techniques. Accordingly, the particular illustrative configurations of system and device elements detailed herein can be varied in other embodiments. These and numerous other alternative embodiments within the scope of the appended claims will be readily apparent to those skilled in the art.

What is claimed is:
1. A method comprising steps of:
   querying a user to identify one or more true positive documents in relation to a sample document;
   querying the user to identify a document repository that contains documents similar to the sample document;
   implementing a document classification algorithm to:
      analyze a collection of documents within the document repository to identify a set of multiple documents corresponding to the sample document, wherein said analyzing comprises parsing the collection of documents within the document repository to the set of documents based on one or more keywords present in the sample document and in each document of the set;
      present at least a portion of the set of multiple documents to the user for user classification, wherein said user classification comprises manual classification of each document in the at least a portion of the set of multiple documents as one of (i) a true positive document in relation to the sample document and (ii) a false positive document in relation to the sample document;
   calculating a confidence measure based on the user classification of the at least a portion of the set of multiple documents, wherein said confidence measure corresponds to a level of accuracy by which the document classification algorithm detects one or more documents related to the sample document as compared to the user classification;
   querying the user as to whether the document classification algorithm is to be deployed based on sufficiency of the calculated confidence measure, as determined by the user; and deploying the document classification algorithm upon an affirmative response from the user in response to said querying as to whether the document classification algorithm is to be deployed;

wherein the steps are carried out by at least one computer device.

2. The method of claim 1, wherein said analyzing further comprises parsing the collection of documents within the document repository based on document type.

3. The method of claim 1, wherein said analyzing further comprises parsing the collection of documents within the document repository based on one or more items of metadata.

4. The method of claim 1, wherein said presenting at least a portion of the set of multiple documents to a user for user classification comprises selecting one or more documents from the set of multiple documents based on one or more document attributes.

5. The method of claim 1, wherein said presenting at least a portion of the set of multiple documents to a user for user classification comprises selecting one or more documents from the set of multiple documents based on a marginal learning benefit associated with the one or more documents.

6. The method of claim 1, further comprising:
presenting one or more additional documents from the set of multiple documents to the user for user classification if the calculated confidence measure does not meet a threshold value.

7. The method of claim 1, further comprising:
repeating one or more iterations of said presenting step and said calculating step until the calculated confidence measure surpasses a threshold value.

8. The method of claim 7, wherein said threshold value is determined by the user.

9. The method of claim 1, further comprising:
querying the user to provide the sample document.

10. The method of claim 1, wherein said sample document represents a type of document to be classified by the document classification algorithm.

11. An article of manufacture comprising a processor-readable storage medium having processor-readable instructions tangibly embodied thereon which, when implemented, cause a processor to carry out the steps of the method of claim 1.

12. An apparatus comprising:
a memory; and
at least one processor coupled to the memory and configured to:
query a user to identify one or more true positive documents in relation to a sample document;
query the user to identify a document repository that contains documents similar to the sample document;
implement a document classification algorithm to:
analyze a collection of documents within the document repository to identify a set of multiple documents corresponding to the sample document, wherein said analyzing comprises parsing the collection of documents within the document repository to the set of documents based on one or more keywords present in the sample document and in each document of the set;
present at least a portion of the set of multiple documents to the user for user classification, wherein said user classification comprises manual classification of each document in the at least a portion of the set of multiple documents as one of (i) a true positive document in relation to the sample document and (ii) a false positive document in relation to the sample document;
calculate a confidence measure based on the user classification of the at least a portion of the set of multiple documents, wherein said confidence measure corresponds to a level of accuracy by which the document classification algorithm detects one or more documents related to the sample document as compared to the user classification;
query the user as to whether the document classification algorithm is to be deployed based on sufficiency of the calculated confidence measure, as determined by the user; and
deploy the document classification algorithm upon an affirmative response from the user in response to said querying as to whether the document classification algorithm is to be deployed.

13. A method comprising steps of:
receiving a sample document from a user, wherein said sample document represents a type of document to be classified by a document classification algorithm;
querying the user to identify one or more true positive documents in relation to the sample document;
querying the user to identify a document repository that contains documents similar to the sample document;
implementing the document classification algorithm to:
analyze a collection of documents within the document repository identified by the user to identify a set of multiple documents corresponding to the sample document, wherein said analyzing comprises parsing the collection of documents within the document repository to the set of documents based on one or more keywords present in the sample document and in each document of the set;
present at least a portion of the set of multiple documents to the user for manual classification of each of the presented documents as either (i) related to the sample document or (ii) not related to the sample document;
calculating a confidence measure based on the manual classification of the at least a portion of the set of multiple documents, wherein said confidence measure corresponds to a level of accuracy by which the document classification algorithm detects one or more documents related to the sample document as compared to the user classification;
querying the user as to whether the document classification algorithm is to be deployed based on sufficiency of the calculated confidence measure, as determined by the user; and
deploying the document classification algorithm upon an affirmative response from the user in response to said querying as to whether the document classification algorithm is to be deployed;
wherein the steps are carried out by at least one computer device.

14. The method of claim 13, further comprising:
repeating one or more iterations of said presenting step and said calculating step until the calculated confidence measure surpasses a threshold value.

15. The method of claim 13, further comprising:
presenting one or more additional documents from the set of multiple documents to the user for user classification if the calculated confidence measure does not meet a threshold value.

16. The method of claim 15, wherein said threshold value is determined by the user.

17. The method of claim 13, wherein said analyzing further comprises parsing the collection of documents within the document repository based on document type.

18. The method of claim 13, wherein said analyzing further comprises parsing the collection of documents within the document repository based on one or more items of metadata.

19. The method of claim 13, wherein said presenting at least a portion of the set of multiple documents to a user for user classification comprises selecting one or more documents from the set of multiple documents based on one or more document attributes.

20. The method of claim 13, wherein said presenting at least a portion of the set of multiple documents to a user for user classification comprises selecting one or more documents from the set of multiple documents based on a marginal learning benefit associated with the one or more documents.

\* \* \* \* \*